(No Model.) 2 Sheets—Sheet 1.

H. F. BEIMLING.
CENTRIFUGAL LIQUID SEPARATOR.

No. 357,547. Patented Feb. 8, 1887.

WITNESSES:
Th. Rolle.
A. P. Grant.

INVENTOR:
Henry F. Beimling
BY
ATTORNEY.

(No Model.)  2 Sheets—Sheet 2.

H. F. BEIMLING.
CENTRIFUGAL LIQUID SEPARATOR.

No. 357,547.  Patented Feb. 8, 1887.

WITNESSES:
Th. Rolle
A. P. Grant

INVENTOR:
Henry F. Beimling
BY
ATTORNEY.

UNITED STATES PATENT OFFICE.

HENRY F. BEIMLING, OF PHILADELPHIA, PENNSYLVANIA, ASSIGNOR OF ONE-HALF TO CHARLES S. WEIERMAN, OF SAME PLACE.

CENTRIFUGAL LIQUID-SEPARATOR.

SPECIFICATION forming part of Letters Patent No. 357,547, dated February 8, 1887.

Application filed October 27, 1886. Serial No. 217,359. (No model.)

*To all whom it may concern:*

Be it known that I, HENRY F. BEIMLING, a subject of the King of Prussia, having resided one year last past in the United States, and made oath of intention to become a citizen thereof, a resident of the city and county of Philadelphia, State of Pennsylvania, have invented a new and useful Improvement in Centrifugal Liquid-Separators, which improvement is fully set forth in the following specification and accompanying drawings, in which—

Figure 1:
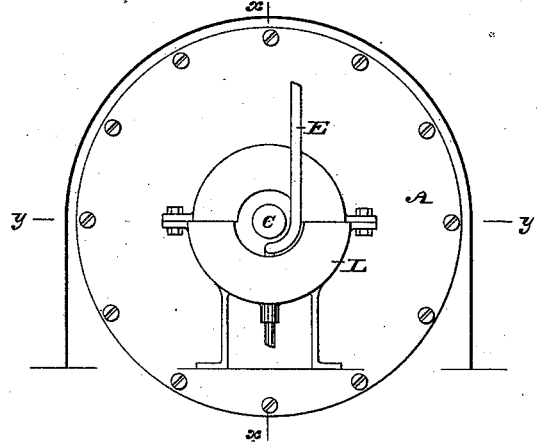
Figure 2:
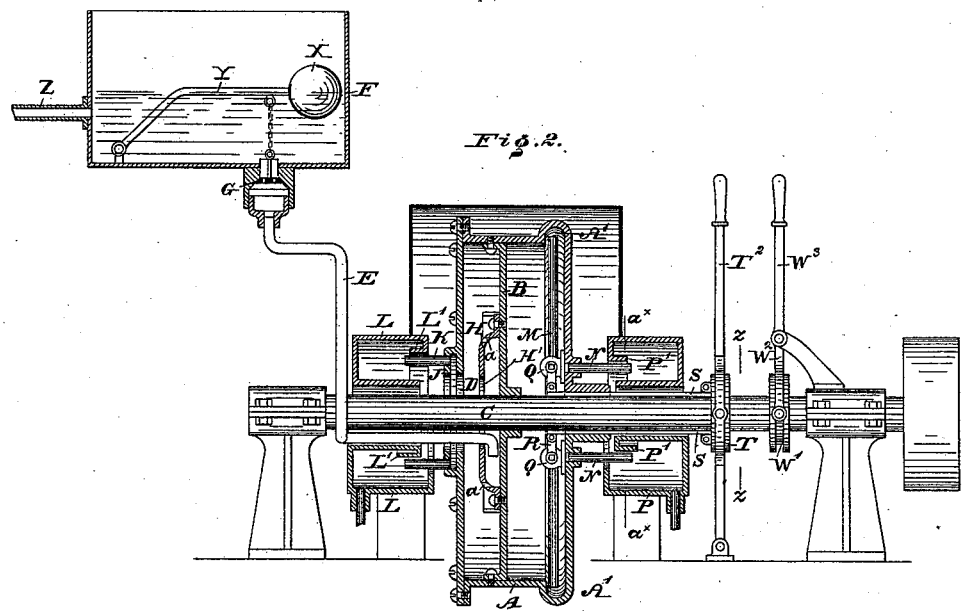
Figure 3:
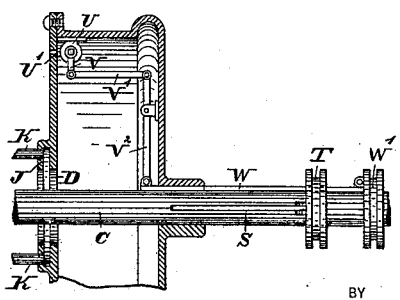
Figure 4:
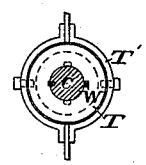
Figure 5:
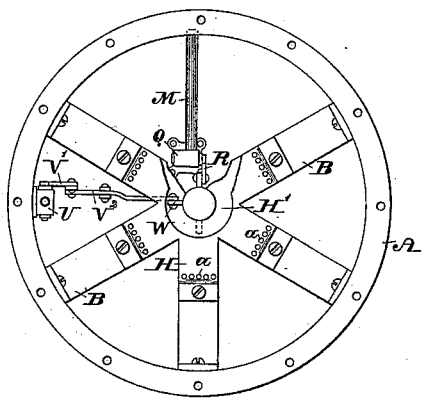
Figure 6:
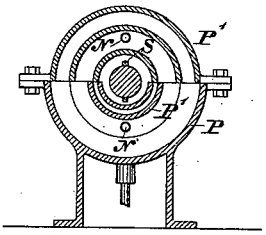

Figure 1 represents an end view of a milk and cream separator embodying my invention. Fig. 2 represents a longitudinal section thereof in line $x\,x$, Fig. 1. Fig. 3 represents a longitudinal section of a portion in line $y\,y$, Fig. 1. Fig. 4 represents a section in line $z\,z$, Fig. 2. Fig. 5 represents an end view of the interior of the cylinder of the separator. Fig. 6 represents a section in line $a^x\,a^x$, Fig. 2.

Similar letters of reference indicate corresponding parts in the several figures.

My invention consists of a device for expeditiously separating cream from milk and directing the cream and milk to different receivers. Provision is also made for regulating the discharge of milk from the separating-cylinder, and washing the interior of said cylinder, as will be hereinafter fully set forth.

Referring to the drawings, A represents the separating cylinder or chamber, within which is a spider, B, whose arms are secured to the periphery of the cylinder and to the shaft C, the latter being properly mounted and receiving power in any suitable manner. One side of the cylinder has an opening, D, through which freely passes the driving-shaft C and the milk-supply pipe E, the latter being connected with a tank, F, having a valve, G, for adjusting the flow of milk to said pipe E.

Secured to the arms of the spider B is a guard, H, which has an opening, H', in its center to receive the supply-pipe E, the arms of said guard H being dishing, it being noticed that the end of said pipe is in the space between the guard H and the spider B, so that the milk is discharged into said space and escapes therefrom through the perforations $a$ in the periphery of said guard.

Secured to the side of the cylinder A, around the opening D, is an annular flange, J, to which are attached pipes K, which project horizontally therefrom into a cream-receiving vessel or cylinder, L, which is properly supported adjacent to the cylinder A, the side of the cylinder L having an opening to receive the pipes K and permit them to rotate therein. Within the cylinder A, on the side opposite to the flange J, are secured radial pipes M, for discharging skimmed milk from the cylinder, which pipes are in communication with pipes N, the latter passing through said side of the cylinder and rotating therewith, and projecting into a vessel or cylinder, P, for receiving the skimmed milk, which vessel is properly supported adjacent to the cylinder A, and has an opening in its side to receive the pipes N and permit them to rotate therein. The pipes M have their outer ends adjacent to the inner periphery of the cylinder A, said periphery being swelled to form a channel, A', for reliably directing the milk to said outer ends of the pipes, as will be hereinafter more fully explained.

The pipes M N are in communication and form elbows, at the angles of which are cocks Q, for adjusting the flow of skimmed milk from the cylinder A.

Attached to the plugs of the cocks are arms R, to which are pivoted rods or bars S, the latter extending parallel with the shaft C, and passing freely through slots in the side of the cylinder A and central opening of the vessel P, and having their outer ends pivoted to a disk, T, which is fitted on the shaft C by a feather, so as to rotate with said shaft, and have sliding motions thereon, said disk being freely encircled by the yoke T', to which is pivoted an operating-lever, T², whereby said yokes T', disk T, rods S, and arms R may be moved and the plugs of the cocks Q rotated, thus opening or closing the cocks to partial extent, as required, this being accomplished without stopping the machine.

Within the cylinder A is a cock, U, which opens into the cylinder and is connected with a short pipe or branch, U', which opens outside of said cylinder. Attached to the plug of said cock is an arm, V, and to said arm V is pivoted an arm, V', the latter being pivoted to an arm, V², which is mounted on the wall of the cylinder A. Connected with the arm V² is a rod or bar, W, which extends parallel with the shaft C and passes through a slot in the side of the cylinder, also through the central opening of the vessel P and an opening in the disk T, and having its outer end pivoted to a disk, W', which is fitted on the shaft C by a feather, so as to rotate with said shaft and have sliding motions thereon, said disk W' being freely encircled by a yoke, W², to which is pivoted an operating-lever, W³, whereby said yoke W², disk W', bar W, and arms V² V' V may be moved and the plug of the cock U rotated for opening and closing said cock. By this provision water may be introduced into the cylinder through the tank F and pipe E, and discharge through the cock U, so that the cylinder may be thoroughly washed and cleansed, said cock being closed during the cream-separating operation.

The valve G of the tank F closes upwardly against its seat on the under side of said tank, and is connected with a float, X, within the tank, said float being connected with an arm, Y, which is pivoted to the tank.

In the valve G are vertical openings, so that when the supply of milk in the tank F is excessive the float rises and closes the valve on its seat. Some of the milk, however, escapes through the perforations of the valve, so as to keep the cylinder supplied. When the adjusted level of milk in the tank is again attained, the valve G is permitted to open to a greater extent as the supply of milk decreases, so that there is an equable supply of milk to the cylinder.

The operation is as follows: The tank F receives milk from a primary tank through the pipe Z. The milk enters the pipe E and reaches the cylinder A, and is discharged from the pipe E between the arms of the spider B and the arms of the guard H, the milk then escaping through the perforations a into the cylinder, the latter revolving, as is evident. Owing to the perforations a, the stream of milk is broken and churning of the same is prevented. Owing to centrifugal action, the milk, which is heavier than cream, is forced to the periphery of the cylinder, where it enters the pipes M, and so discharged into the receiver P. The cream, being lighter, gathers at the center of the cylinder, and is driven through the opening D, and, owing to centrifugal action, forced into the annulus J, whence it is discharged through the pipes K into the receiver L.

The receivers L P have flanges L' P' extending within the same from the sides thereof adjacent to the cylinder A and parallel to the pipes K and N, respectively, so as to aid in preventing the leakage of the cream and skimmed milk as they respectively enter the said receivers through the said pipes.

The receivers P L are each provided with a suitable discharge-pipe, which directs the milk and cream to a place of collection.

Having thus described my invention, what I claim as new, and desire to secure by Letters Patent, is—

1. In combination with a rotary separating-cylinder, a supply-tank, an arm pivoted within said tank and provided with a float at its upper end, a perforated valve connected to said arm by a chain, the said valve having its seat above its upper face, and a pipe connecting the valve-chamber and cylinder, whereby an automatic regulating device is formed for controlling the inflow into the rotary cylinder, substantially as described.

2. A rotary cylinder, with means for rotating the same, in combination with stationary cream and skim-milk receivers, pipes leading from said cylinder into said receivers, a supply-tank, an inlet-pipe leading from said tank into said cylinder, passing through one of said receivers, a valve-chamber with a perforated valve, and a tank having an inlet-pipe and provided with a pivoted arm with float, the said arm being connected to said perforated valve, all substantially as described.

3. In a cream separator, a rotary cylinder having the flange J, in combination with pipes K and the stationary receiver L, having inner flanges, L', all substantially as and for the purpose set forth.

4. A rotary cylinder having the peripheral channel A', in combination with the pipe M, opening into said peripheral channel, the pipe N, leading from pipe M and passing through the wall of said rotary cylinder and into the receiver P, and the stationary receiver P, having inner flange, P', all substantially as described.

5. In a milk and cream separator, a separating-cylinder having within it a cock, in combination with arms attached to the plug of said cock, a disk on the shaft of said cylinder, with which said arms are connected, a yoke encircling said disk, and a lever pivoted to said yoke, the parts being combined and operating substantially as described.

6. The rotary cylinder A, with the extended channel A' in its periphery, in combination with the axle or shaft C, secured to said cylinder, the receiver P, the pipes M N, leading from the inner periphery of the cylinder A to said receiver P, the cock Q in said pipe M, the arms S, connected to said cock and to a sliding disk, T, the yoke T', and lever T², the said sliding disk being mounted on and adapted to revolve with said shaft, all substantially as and for the purpose set forth.

7. A milk and cream separator having a rotary cylinder, a spider secured to the periphery of said cylinder, and perforated guards within the cylinder and secured to said spider, the supply-pipe opening into the cylinder between said guards and spider, all combined substantially as described.

HENRY F. BEIMLING.

Witnesses:
ROBT. AITON,
A. P. GRANT.